Patented Aug. 19, 1952

2,607,749

UNITED STATES PATENT OFFICE 2,607,749

INTERPOLYMERS OF STYRENE AND MIXED ESTERS OF POLYHYDRIC ALCOHOL AND DRYING OIL ACID IN THE PRESENCE OF A TERPENE

Leslie Ernest Wakeford, London, England, and Donald Helmsley Hewitt, deceased, late of London, England, by Ernest Booth, Richmond, England, and Richard Hartlebury Buckle, Barnt Green, England, executors, assignors, by mesne assignments, to The Sherwin-Williams Company, Cleveland, Ohio, a corporation of Ohio No Drawing. Application October 17, 1951, Serial No. 251,814. In Great Britain July 28, 1942

13 Claims. (Cl. 260—22)

This invention relates to the manufacture of interpolymers of styrene with polyhydric alcoholic mixed esters containing substantial proportions of unsaturated fatty acid radicals, and of coating compositions obtained therefrom, and is an improvement in or modification of the invention forming the subject matter of the prior United States Patent No. 2,392,710, dated January 8, 1946. The present application is a continuation-in-part of our copending U. S. application, Serial No. 623,886 now abandoned, which, in turn, is a continuation-in-part of our U. S. Patent 2,392,710.

In the prior specification aforementioned there is described a process for the production of interpolymers of aromatic vinyl hydrocarbons with polyhydric alcoholic mixed esters containing substantial proportions of unsaturated fatty acid radicals by first subjecting a polyhydric alcoholic mixed ester, or a mixture of such esters (other than products obtained by heat blending a frosting drying oil with a varnish gum or resin) to a polymerizing heat treatment so as to produce a partially polymerized product having a desired predetermined degree of polymerization, thereupon adding an aromatic vinyl hydrocarbon to the partially polymerized polyhydric alcoholic mixed ester or mixture of such esters and then subjecting the mixture of the said materials to a further polymerization treatment in the presence or absence of a suitable common solvent for the several ingredients. The above mentioned U. S. Patent No. 2,392,710 mentions, as specific examples of suitable polyhydric alcoholic esters, those in which the glycerol is replaced by pentaerythritol, mannitol or sorbitol. Amongst the examples of the process described in the prior specification above referred to, there may be mentioned the reaction of styrene with partially polymerized polyhydric alcoholic mixed esters such as linseed stand oil, dehydrated castor oil, or the product obtained by heating together glycerol, phthalic anhydride and linseed oil fatty acids, the reaction being effected by heating the ingredients in various solvents such as turpentine, xylol, or mineral spirits. In carrying out the prior process in question, whether in the presence or absence of a solvent, the whole amount of the styrene employed was added initially to the partially polymerized polyhydric alcoholic mixed ester or mixture of such esters. In certain cases, however, particularly when there is used as a solvent mineral spirits, it has been found that after carrying out the reaction both the solution and also the films produced therefrom exhibit a more or less marked opalescence or opacity. A further disadvantage that arises, especially where the solvent comprises mineral spirits, is a somewhat low degree of styrene polymerization as shown by the rather low percentage solids content of the final product obtained upon completion of the reaction, this being due to the short time required for the reaction to proceed in this solvent until the requisite viscosity of the final product is obtained. One method of overcoming the disadvantages above mentioned has been described in the specification of the copending British Patent 573,835; this method consisted in carrying out the reaction between the styrene and a partially polymerized polyhydric alcoholic mixed ester for the production of the styrene-ester interpolymers by adding a portion only of the styrene to the partially polymerized ester at the commencement of the reaction, the remainder of the styrene being added in determined portions over predetermined intervals of time during the course of the reaction.

It appears that opalescence in mineral spirit varnishes is due to the incompatibility of different molecular species. The use of interval addition of styrene, according to the prior British Patent No. 573,835 hereinbefore mentioned, has the effect of reducing the average length of the styrene chains which are combined with the partially polymerized ester (which is dependent on the ratio of the partially polymerized ester, such as oil, to styrene in the original mixture), thus yielding clear varnishes without materially affecting the properties of the finished product. In addition, the fact that shorter styrene chains are being formed enables the reaction to be continued for a longer time to reach the required viscosity, and in general a larger proportion of the styrene is able to polymerize.

Further, when carrying out the reaction between styrene and a partially polymerized polyhydric alcoholic mixed ester by heating the ingredients in xylol, it has been found that in the case when very heavily bodied oils are used, such as a dehydrated castor oil having a viscosity of 120 poises at 25° C., there is a strong tendency for gelation to occur before most of the styrene has polymerized, and the product finally obtained is in any case not stable in the can when employed in paint and varnish compositions.

The present invention has for its object to improve generally the process for the manufacture of interpolymers of styrene with polyhydric alcoholic mixed esters and of coating compositions obtained therefrom (particularly with regard to improving the can-stability, clarity, and film-forming characteristics of the latter) and to overcome the various disadvantages above referred to which arise when mineral spirits are used as the solvent and also when the partially polymerized polyhydric alcohol ester comprises a heavily bodied oil. For this purpose according to the present invention the reaction between the styrene and the partially polymerized polyhydric alcoholic mixed ester for the production of compatible soluble styrene-ester interpolymers is effected in the presence either of a solvent admixed with a proportion of a terpene or of a terpene solvent or turpentine. By this means the chain length of the polystyrene portion of the interpolymer that is formed can be so regulated that products of more desirable characteristics can be obtained. Particularly good results have been obtained by effecting the reaction for the production of the interpolymers in the presence of monocyclic or dicyclic alpha terpenes, the former, such as dipentene, being particularly adapted for use in admixture with other solvents such as xylol or mineral spirits. As an example of the dicyclic alpha terpenes for use in connection with the present process, there may be mentioned alpha pinene.

Throughout the present specification and claims it is to be understood that the term "polyhydric alcoholic mixed ester" is employed solely to designate the ester of a signle polyhydric alcohol and a mixture of acids containing a substantial proportion of at least one drying oil fatty acid.

The following are some examples of carrying out the improved process according to the present invention, in which the parts mentioned are all by weight:

Example 1

50 parts of dehydrated castor oil polymerized to a viscosity at 25° C. of 100 poises were dissolved in 95 parts of xylene to which 5 parts commercial dipentene had been added; 50 parts of monomeric styrene were then added and the whole mixture heated under a reflux condenser for 22 hours, when the product obtained was a clear solution which gave a clear film; the solution had a solids content of 45 per cent and a viscosity of 95 seconds measured in the Ford No. 4 cup at 25° C.

With only 3 parts instead of 5 parts of dipentene, the quantities of the other ingredients of the mixture being unaltered, the varnish became gelatinous after heating for only 8 hours under a reflux condenser, whilst the solids figure of the product was less than 40 per cent. On the other hand with 10 parts of dipentene and the same quantities of the other ingredients of the mixture, the solution required 36 hours heating under a reflux condenser to reach a viscosity of 53 seconds measured in the Ford No. 4 cup at 25° C. and the film obtained from the product, even after the addition of dryers, was slow drying. The action of the terpene is believed to depend on its property of producing relatively short styrene chains attached to a larger number of centres of activation of the oil molecules than is the case when longer styrene chains are formed; thus, the oil has fewer centres of activation free, and consequently it is not able to cross-link to the gel stage so readily. It will be well understood that if too much terpene is used, more of the active centres of the oil are used up, and the drying of the product will be impaired.

Example 2

50 parts of dehydrated castor oil polymerized to a viscosity at 25° C. of 7 poises were dissolved in 90 parts of mineral spirits to which 10 parts turpentine had been added; 50 parts of styrene were then added and the whole mixture heated under a reflux condenser for 23 hours, when the product finally obtained was a slightly opalescent varnish, which on drying gave a clear film; the varnish had a solids content of 49 per cent and a viscosity of 150 seconds measured in the Ford No. 4 cup at 25° C. A corresponding reaction between the same ingredients but without the turpentine gave, after 17 hours heating under a reflux condenser, a product which had a solids content of 44 per cent and a viscosity of 330 seconds measured in the Ford No. 4 cup at 25° C.; the solution formed under these conditions was opaque and gave an opalescent film.

In both the above-mentioned examples, the terpene improves the product by giving rise to greater compatibility in the varnish and film.

The different effects on the polymerization of the reactants when carried out in the presence of monocylic or dicyclic alpha terpenes as the sole solvents are illustrated by the following Examples 3 and 4.

Example 3

16.7 parts of dehydrated castor oil polymerized to a viscosity at 25° C. of 40 poises and 8.3 parts of linseed stand oil polymerized to a viscosity at 25° C. of 30 poises were dissolved in 50 parts of dipentene; 25 parts of monomeric styrene were then added and the whole mixture heated under a reflux condenser for 46 hours, when the product obtained was a clear solution having a solids content of 46.5 per cent and a viscosity of 35 seconds measured in the Ford No. 4 cup at 25° C. The clear varnish solution thus produced, after the addition thereto of cobalt naphthenate to give 0.05 per cent cobalt metal based on the solid interpolymer content of the solution, formed a clear film which required 12 hours to dry.

Example 4

16.7 parts of dehydrated castor oil polymerized to a viscosity at 25° C. of 40 poises and 8.3 parts of linseed stand oil polymerized to a viscosity at 25° C. of 30 poises were dissolved in 50 parts of alpha pinene; 25 parts of monomeric styrene were then added and the whole mixture heated under a reflux condenser for 9 hours, when the product obtained was a clear solution having a solids content of 48 per cent and a viscosity of 560 seconds measured in the Ford No. 4 cup at 25° C. The clear varnish solution formed under these conditions, without the addition of any driers thereto, gave a clear film which dried in half-an-hour.

It is to be noted that the use of monocyclic alpha terpenes, such as dipentene, as the sole solvent, tends to the production of slow drying varnishes. It is preferred therefore to employ this class of terpene in admixture with a main solvent, such as an aromatic hydrocarbon, for instance, xylol, and/or an aliphatic hydrocarbon, for instance mineral spirits, the necessary proportions being determined by experiment in accordance with the particular polyhydric alcoholic mixed ester, such as the oil or alkyd resin, which is to be copolymerized with the styrene.

Example 5

There was first prepared an alkyd resin by heating together 1400 parts of phthalic anhydride, 848 parts of glycerine and 2088 parts of distilled linseed oil fatty acids to 250° C. in two hours in an open vessel and then maintaining the reaction mixture at that temperature for six hours. The resulting resin had an acid value of 23.

180 parts of the alkyd resin, prepared as above described, 20 parts of monomeric styrene, 99 parts of dehydrated castor stand oil polymerized to a viscosity at 25° C. of 46 poises and a mixture consisting of 342 parts of mineral spirits and 18 parts of dipentene were heated under a reflux condenser for three hours. A further 20 parts of styrene were then added and the reaction continued by refluxing for a further three hours. A third portion of 20 parts of styrene was then added and the reaction continued under the same conditions for three hours more. Finally a fourth portion of 20 parts of styrene was added and the reaction continued by refluxing for 23 hours. The final product obtained was a star bright resin solution, having a solids content of 46.7 per cent and a viscosity of 89 seconds measured in the Ford No. 4 cup at 25° C., which gave a clear quick-drying film.

Example 6

An experiment was carried out similar to that described in Example 5, save that 9 parts of the mineral spirits were replaced by the same proportion of dipentene, so that the solvent in which the alkyd resin, styrene, and dehydrated castor oil were heated consisted of a mixture of 333 parts of mineral spirits and 27 parts of dipentene. The final product obtained was a star bright resin solution, having a solids content of 47 per cent and a viscosity of 54 seconds measured in the Ford No. 4 cup at 25° C. which likewise gave a clear film having good drying properties.

For comparative purposes there was carried out an experiment similar to that described in Example 6, save that the 27 parts of dipentene were replaced by the same proportion of mineral spirits, so that the solvent in which the alkyd resin, styrene, and dehydrated castor oil were dissolved consisted entirely of mineral spirits, and after the addition of the last 20 parts of styrene the mixture was heated under a reflux condenser for 9½ hours in place of 23 hours. Under these conditions the final product obtained was a very slightly opalescent resin solution, having a solids content of 44 per cent and a viscosity of 118 seconds measured in the Ford No. 4 cup at 25° C., which dried rapidly to a clear film. When examined ten months after manufacture, the final product made as just described (that is with a solvent consisting entirely of mineral spirits) was found to have gelled in the container, whereas the product prepared as described in Example 6 (that is with a solvent comprising mineral spirits and dipentene), after the lapse of a similar time interval, was found to be in excellent condition, having a viscosity of 100 seconds measured in the Ford No. 4 cup at 25° C.

It is to be noted that, in carrying out the present process, the whole of the styrene may be added initially to the ester and solvent as in the method according to U. S. A. Patent 2,392,710 dated January 8, 1946, or alternatively the styrene may be added at intervals to the other ingredients as in the method according to British specification No. 20,945/43. Further the terpene may be added to the other ingredients during the progress of the reaction, if desired at suitable intervals; an example of this method is given below:

Example 7

A mixture consisting of 90 parts of styrene, 110 parts of dehydrated castor oil polymerized to a viscosity at 25° C. of 100 poises and 200 parts of xylol was heated under a reflux condenser for 2 hours; 50 parts of dipentene were then added and the heating of the whole mixture under the reflux condenser was continued for another 14 hours to a viscosity of 40 seconds measured in the Ford No. 4 cup at 25° C. and a solids content of 32 per cent. Further heating under a reflux condenser caused no increase in the viscosity of the solution. The product obtained was a clear solution, which, after the addition thereto of a drier as in Example 3 above, gave clear films which dried overnight and was stable in the can. The viscosity of the product rose from 40 seconds to only 58 seconds, measured in the Ford No. 4 cup at 25° C., after eight months' storage.

The addition of the terpene ingredient during the course of the reaction gives added flexibility to the process and may be used to produce clear solutions of low viscosity and excellent can stability, yielding films which dry particularly hard in the presence of driers.

As stated in our U. S. Patent 2,392,710, the reaction between styrene and the partially polymerized polyhydric ester may be accelerated by the use of catalysts normally employed in the polymerization of styrene, suitable catalysts being, for example, benzoyl peroxide or air. However, as shown by the examples herein, the process can be carried out in the absence of any catalyst.

Lastly, it is to be noted that in carrying out the process for the production of interpolymers of styrene with polyhydric alcoholic mixed esters by the process according to the present invention the toughness and durability of the films flowed from the product finally obtained do not appear to be materially affected, although there may be some increase in the drying time of the films, which, however, is probably an advantageous factor when the product is to be employed in a brushing finish. Further the can stability of the products produced by the present process, whether clear or pigmented, is considerably greater than that of the corresponding products made in the absence of terpene solvents.

By the present process there can be obtained products which, as contrasted with polystyrene, are specially useful for the production of coating compositions such as paints. The new products are also useful as a basis for stove enamels using low temperatures. Other applications of products manufactured in accordance with the invention include aircraft and motor-car finishes, electrical insulating materials, adhesive materials, printing inks, moulded compositions and laminated materials.

What is claimed is:

1. A process for the production of an interpolymer consisting of styrene in chemical combination with at least one mixed ester of a polyhydric alcohol having not more than 6 hydroxyl groups, said ester containing substantial proportions of at least one drying oil fatty acid radical, comprising heating a compound of the class consisting of said mixed ester and mixtures thereof to partially polymerize the same and heating said partially polymerized compound with said styrene to chemically combine said compound and said styrene, said last mentioned heating step being carried out in the presence of a solvent comprising sufficient turpentine to improve can-stability and clarity of the interpolymer.

2. A process as claimed in claim 1 wherein the solvent consists of turpentine.

3. A process as claimed in claim 1 wherein the solvent comprises turpentine and an aliphatic hydrocarbon.

4. A process as claimed in claim 3 wherein the solvent comprises turpentine and mineral spirits.

5. A process as claimed in claim 1 wherein the solvent comprises turpentine and an aromatic hydrocarbon.

6. A process as claimed in claim 5 wherein the solvent comprises turpentine and xylol.

7. A process as claimed in claim 1 in which a portion only of the requisite quantity of styrene is added to the other ingredients at the commencement of the reaction, the remainder of the styrene being added in determined portions over predetermined intervals of time during the course of the reaction for the production of the styrene-ester interpolymers.

8. A process as claimed in claim 1 wherein the turpentine is added to the other ingredients during the progress of the reaction.

9. A process as claimed in claim 1 wherein the mixed ester is dehydrated castor oil.

10. A process as claimed in claim 1 wherein the compound comprises a mixture of dehydrated castor oil and linseed stand oil.

11. A process as claimed in claim 1 wherein the mixed ester comprises an alkyd resin formed from glycerol, linseed oil fatty acids and phthalic anhydride.

12. Compositions comprising interpolymers of styrene with partially polymerized polyhydric alcoholic mixed esters when produced by the process claimed in claim 1.

13. A non-catalytic process for the production of interpolymers of styrene with a mixed ester of a polyhydric alcohol having not more than 6 hydroxyl groups, said ester containing substantial proportions of at least one drying oil fatty acid radical, comprising heating a compound of the class consisting of said mixed ester and mixtures thereof, to partially polymerize the same and heating said partially polymerized compound with styrene in the presence of a solvent comprising sufficient turpentine to improve can-stability and clarity of the product.

LESLIE ERNEST WAKEFORD.
ERNEST BOOTH,
RICHARD HARTLEBURY BUCKLE,
Executors of Donald Helmsley Hewitt, Deceased.

REFERENCES CITED

The following references are of record in the file of this patent:

UNITED STATES PATENTS

| Number | Name | Date |
|---|---|---|
| 2,567,137 | Wakeford et al. | Sept. 4, 1951 |